United States Patent [19]

Murray et al.

[11] 4,248,460
[45] Feb. 3, 1981

[54] PLASTIC PIPE FITTING

[76] Inventors: Coyt E. Murray, P.O. Drawer 12427, Gastonia, N.C. 28052; Jack L. Workman, 1745 Woodvale Rd., Charleston, W. Va. 25314

[21] Appl. No.: 860,880

[22] Filed: Dec. 15, 1977

[51] Int. Cl.² .............................................. F16L 23/00
[52] U.S. Cl. ................................... 285/363; 285/367; 285/423; 285/DIG. 17; 285/DIG. 24
[58] Field of Search ............... 285/260, 423, DIG. 17, 285/DIG. 10, DIG. 24, 335, 390, 363, 367; 138/109

[56] References Cited

U.S. PATENT DOCUMENTS

| 2,088,763 | 8/1937 | Sample | 285/390 |
| 2,843,153 | 7/1958 | Young | 285/423 X |
| 3,381,715 | 5/1968 | Michael | 138/109 |
| 3,614,137 | 10/1971 | Jacobson | 285/390 |
| 3,650,550 | 3/1972 | West | 285/423 X |
| 3,695,638 | 10/1972 | Blakeley | 285/423 X |
| 3,768,841 | 10/1973 | Byrne | 285/423 X |
| 3,776,996 | 12/1973 | Cameron et al. | 285/423 X |
| 3,971,574 | 7/1976 | Curtin | 285/423 X |
| 4,039,210 | 8/1977 | Wood et al. | 138/109 X |

FOREIGN PATENT DOCUMENTS

| 2320177 | 10/1973 | Fed. Rep. of Germany | 285/423 |
| 858368 | 1/1961 | United Kingdom | 285/423 |

Primary Examiner—Dave W. Arola
Attorney, Agent, or Firm—Clifton T. Hunt, Jr.

[57] ABSTRACT

This invention relates to a plastic pipe fitting having a connecting portion for attachment to another fitting and a joining portion to be fuse bonded to a length of pipe, whereby successive lengths of plastic pipe may be releasably connected. The connecting portion consists only of plastic suitably reinforced to increase its mechanical strength, primarily the flexural modules above the flexural modulus of the joining portion of the fitting and compatible with the flexural modulus of a mechanical couplings to provide a reliably effective connection between adjoining pipe lengths. The connecting portion of the pipe lengths desirably shaped to conform with the configuration of a conventional coupling commonly used to connect metallic pipe lengths.

39 Claims, 5 Drawing Figures

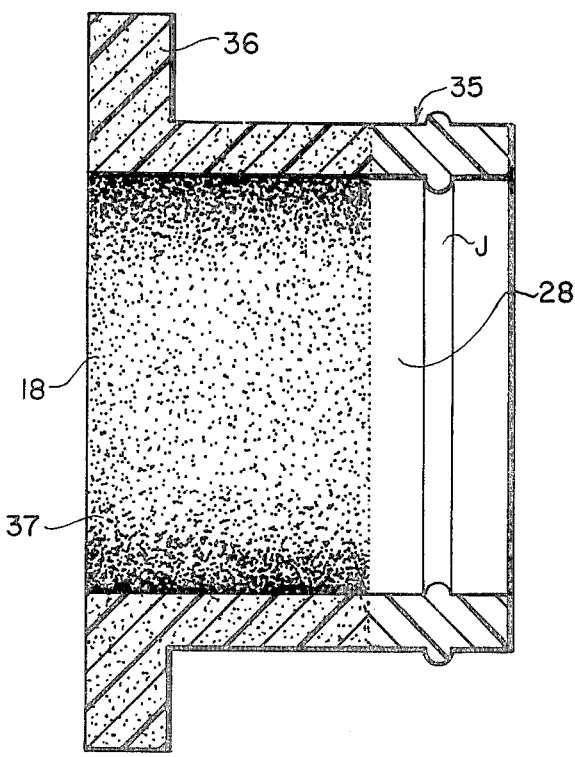
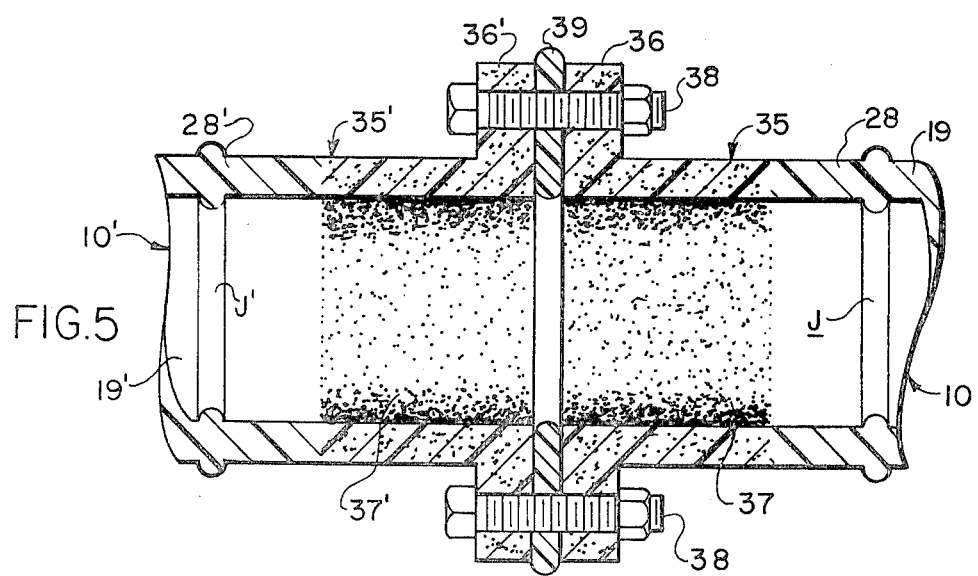

PLASTIC PIPE FITTING

BACKGROUND OF THE INVENTION

Thermoplastic large diameter pipe, principally polyethylene and polybutylene, are increasingly useful in the mining industry. It is used in the mining of coal, copper, molybdenum, phosphate and uranium for slurry, leaching, acid and caustic piping as well as fire, process and portable water lines. The new thermoplastic pipe, especially polyethylene and polybutylene, offer our country a light-weight and economical piping system for mining/energy production, but the thermoplastic pipe lengths are difficult to connect by the conventional butt fusion, or fragile makeshift coupling systems.

The lack of a reliably efficient fitting or coupling which may be readily connected and disconnected has hindered the use of plastic piping in the mining industry. For example, coal mining requires a mobile or portable piping system that allows a miner to take lengths of pipe underground where they are joined or coupled together. Butt fusion or thermal welding of thermoplastic pipe lengths provides a reliably effective coupling. However, lengths of pipe joined by butt fusion cannot be readily disconnected and the butt fusion process cannot be used in an underground mine because of the danger of accidentally igniting the coal dust or methane gas commonly found in mine shafts.

Polyethylene pipe provided with a convenient and reliable fitting for releasably coupling lengths together would make an ideal portable pipe line for an underground coal mine because it possesses the best properties available today with respect to resistance to corrosion, abrasion and impact and its low coefficient of friction. It is light-weight and easy to handle and is sufficiently flexible to be easily bent around corners. There is no scale build-up in plastic pipes such as occurs in steel piping with consequent spray nozzle plugging.

Today's modern mine will advance or grow several hundred feet each week, and as one section is worked out the pipe is moved to another location. A quick mechanical coupling is essential to efficient operation.

The energy requirements for manufacturing polyethylene pipe are only about one-third the energy requirements for making steel or aluminum piping. The increased use of thermoplastic piping to be made possible by the fitting of the present invention will be an energy saver as well as an energy producer.

At least one attempt has been made to use mechanical couplings for joining lengths of plastic pipe. Plastic Pipe Lines Division of M. L. Sheldon Plastics Corporation, 350 Lexington Avenue, New York, New York 10016 has provided special polyethylene adapters on lengths of high density polyethylene pipe, the polyethylene adapters being of the same polymer as the pipe and not having increased mechanical strength properties of the polymer at the connecting portion, but being circumferentially flanged to receive metallic couplings which releasably join lengths of the high density polyethylene pipe together. The polyethylene adapters are not grooved as are conventional metal pipe lengths, but the special abutting flanges on adjoining pipe lengths conform with a metallic coupling such as made by Victaulic Company of America, 3100 Hamilton Boulevard, South Plainfield, New Jersey 07080. This metallic coupling is in two sections and each section is wide enough to fit over the abutting flanges on adjoining pipe lengths. After both sections of the Victaulic coupling have been assembled on the flanges, the two sections are joined by tightening two bolts, one on each side of the pipe. These connections have proven generally satisfactory in low pressure lines such as gravity service provided in decant lines, but the Sheldon connection is not understood to be effective in coupling lengths of plastic pipe subjected to the high pressures sometimes required in pipe lines.

OBJECT OF THE INVENTION

It is an object of this invention to provide reinforced and stabilized plastic connecting portions on lengths of plastic pipe and to shape the reinforced and stabilized plastic connecting portions to conform to the configuration of conventional mechanical couplings customarily used to join lengths of metal pipe, and to thereby increase the efficiency of reliably connecting and disconnecting plastic pipe lengths to facilitate its use as portable piping for the mining industry and elsewhere.

It is a more specific object of the invention to provide a plastic fitting having a connecting portion and a joining portion, the joining portion of the fitting and the body portion of plastic pipe being of the same or compatible base polymers, enabling the joining portion of the fitting and the body portion of the pipe to be joined at the factory as by butt fusion so that the fitting of this invention is an integral part of the pipe when it reaches the workman in the field. The connecting portion of the fitting is all plastic and suitably shaped to conform with any desired conventional mechanical couplings. The mechanical strength properties of the connecting portion are increased to provide a sufficiently higher flexural modulus than the joining portion of the fitting and the associated pipe to be compatible with the mechanical coupling. The connecting portion is also stabilized to be compatible with the tolerances of thermal expansion and contraction in the mechanical couplings conventionally used to join metal pipe together.

It is a further object of the invention to reinforce and stabilize the plastic connecting portions of plastic fittings made from polyethylene or other plastic material so they may be grooved or flanged without adversely weakening the fitting for use with high pressure service.

BRIEF DESCRIPTION OF THE DRAWINGS

FIG. 4 is a horizontal sectional view of a fitting according to the invention with a circumferential flange on the connecting portion;

FIG. 5 is a horizontal sectional view showing the connection of two of the fittings illustrated in FIG. 6; and

DETAILED DESCRIPTION OF THE INVENTION

Referring more specifically to the drawings, the numeral 10 broadly indicates a first length of plastic pipe and the numeral 10' broadly indicates a second length of pipe which is shown as being plastic but which may be metal. One of the advantages of the invention is that lengths of plastic pipe may be connected to lengths of metal pipe by the same conventional mechanical couplings as are conventionally used to connect metal pipe lengths together.

The pipes 10 and 10', as illustrated, have elongated body portions 19 and 19' which may be extruded in a conventional manner from any desired thermoplastic such as polyethylene, polyaramide, ABS, PVC, polypropylene, polybutylene, poly-4-methyl pentene-1, fluorinated ethylene polymer, polyurethane, or polyester. Thermosetting plastics such as phenolic, polyurethane or polyester may also be used in the body portion of the pipe.

It is common practice in laying a high density polyolefin plastic pipe line to butt fuse the ends of the body portions 19 together to connect the adjoining lengths of pipe. Flanged fittings have been provided on the ends of the body portions of plastic pipe lengths, the flanged fittings being connected by mechanical couplings. The conventional mechanical couplings are adapted for use with metal pipe having grooved fittings at the ends of the body portions but it has not heretofore been possible to groove plastic pipe for use with the conventional mechanical coupling customarily used on metal pipe because the grooving undesirably weakens the plastic pipe making it unusable for its intended purpose.

Figure 1:
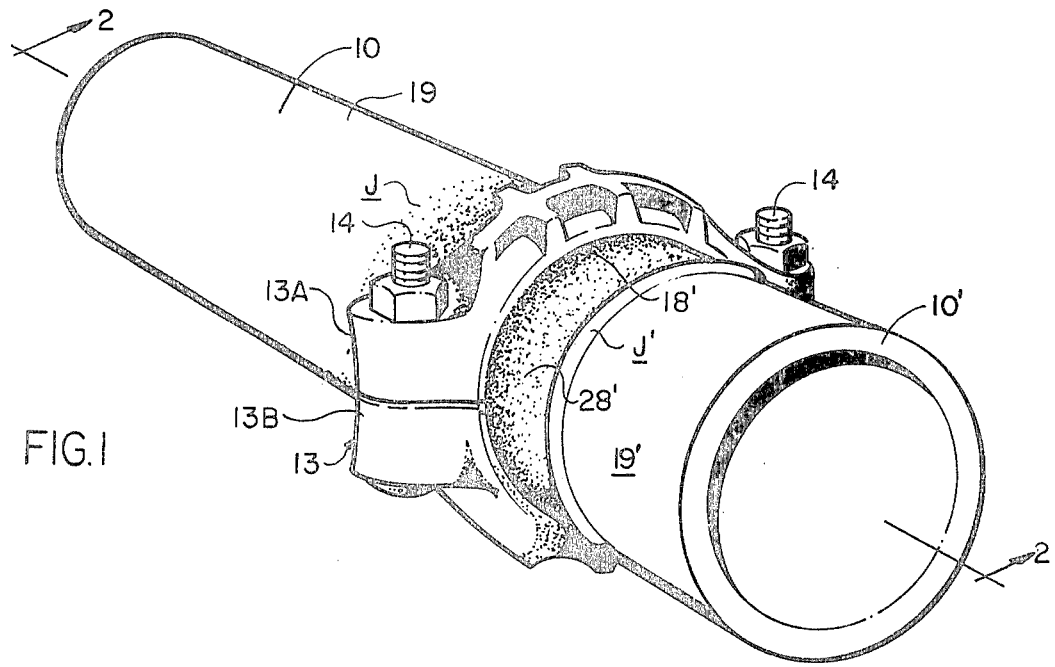
FIG. 1 is a perspective view of a conventional mechanical coupling joining together two lengths of plastic pipe, each including a fitting with a joining portion fused to the pipe and a connecting portion stabilized, all in accordance with the invention.
Figure 2:
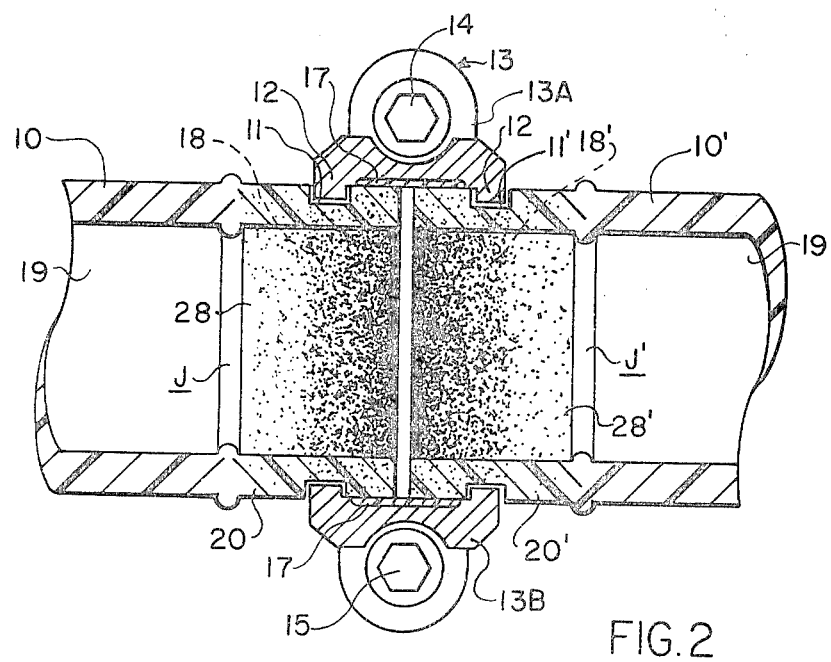
FIG. 2 is a horizontal sectional view taken substantially along the line 2—2 in FIG. 1.

FIG. 2 illustrates the reinforcement and stabilization of the coupling portion of a plastic fitting to give the reinforced area sufficient strength to be satisfactorily grooved for use with a conventional mechanical coupling of the type customarily used to connect adjoining lengths of grooved metal pipe. In the embodiment illustrated in FIG. 2 a circumferential groove 11 is provided in a stabilized and reinforced connecting portion 18 of plastic fitting 20 to receive a coupling member 12 of a conventional mechanical coupling 13. The mechanical coupling 13 is in two pieces, 13A and 13B joined together by bolts 14.

The mechanical coupling is usually made of malleable or ductile iron and is of standard construction. It may, for example, be of the type manufactured by Victaulic Company of America, 3100 Hamilton Boulevard, South Plainfield, N.J. 07080. The inner surface of each segment 13A and 13B of coupling 13 is cut away to provide an annular clearance for a gasket 17 extending circumferentially around the reinforced connecting portions 18 and 18' of adjoining fittings 20 and 20' (FIG. 2). Tightening of the coupling 13 by its bolts 14 draws the segments 13A and 13B together to releasably but reliably connect the reinforced connecting portions 18 and 18' of pipe lengths 10 and 10'. The grooves 11 and 11' in reinforced connecting portions 18 and 18' will satisfactorily retain the clamping portions 12 of clamp 13 without undesirably weakening the pipe. As used herein the term "mechanical coupling" means a separate connection device made of metal or any other material, including plastic having a flexural modulus higher than the body portion of plastic pipe to be connected. The term "connecting portion" means the end of a plastic fitting having a flexural modulus higher than the joining portion of the fitting, higher than the body portion of the pipe, and compatible with the flexural modulus of the mechanical coupling to provide a reliably effective connection.

The base polymers from which plastic pipes are customarily formed are more responsive to changes in temperature and pressure than is the conventional mechanical coupling which this invention contemplates joining the plastic pipe lengths together. These polymers have a tendency to cold flow or move relative to metallic mechanical couplings under the influence of temperature changes and pressure changes. Such movement of the plastic causes it to move away from a metallic mechanical coupling rendering the juncture of adjoining pipe lengths ineffective and causing leakage from the pipe.

According to the invention, the tendency of plastic to cold flow is overcome by reinforcing and stabilizing the plastic from which the connecting portion 18 of fitting 20 is formed so that it has a diminished tendency to cold flow under the influence of changes in temperature and pressure. Adequate reinforcement and stabilization of the connecting portion 18 of fitting 20 is accomplished when the coefficients of expansion, contraction, swelling and shrinkage of the mechanical coupling 13 and the reinforced and stabilized connecting portion 18 are sufficiently close to prevent significant relative movement between metallic coupling 13 and connecting portion 18.

One effective way to reinforce and stabilize the connecting portion 18 of fitting 20 is to make the connecting portion 18 of higher density or higher molecular weight polymer than the remainder or joining portion 28 of fitting 20.

If a difference in molecular weight is used to reinforce the connecting portion 18, it is preferable that the molecular weight of the connecting portion be at least twice the molecular weight of the body portion 19 of the pipe. For example, if the body portion 19 has a molecular weight of 250,000 the connecting portions of the fittings should have a molecular weight of at least 500,000 at the grooves 11 and outwardly therefrom. The molecular weight of the fitting 20 may gradually decrease as it approaches the juncture J of the fitting 20 with the body portion 19 as illustrated in FIG. 2, or the molecular weight of the fitting may be substantially uniform throughout the connecting portion and about two-thirds (⅔) of the joining portion as shown in FIG. 6. The remaining one-third (⅓) of the joining portion is of substantially the same or compatible polymer as the polymer of the body portion of the pipe.

With some polymers it is desirable to add a reinforcing agent such as glass beads or fibers, ceramic slivers or granules, boron, carbon, or polamide-imide fibers, mineral reinforcing agents such as mica, talc, asbestos, and others, to the polymer of the fitting in addition to making the connecting portion of higher density or higher molecular weight than the joining portion 28 of the fitting. With other polymers it will be sufficient to simply add a reinforcing agent without increasing the density or molecular weight of the polymer of the connecting portion 18.

Referring to FIG. 2, if the fitting 20 is reinforced by the addition of reinforcing agents, it is preferred that the area of the connecting portion 18 around the groove 11 will contain about 5–40% of reinforcing agents and the concentration of reinforcing agents will taper off, e.g. from about 40% to 20% to 0% proceeding inwardly from the groove 11 to the juncture J of the fitting 20 with the body portion 19. The joining portion 28 adjacent juncture J retains its virginity sufficiently to be compatible for joining to body portion 19 of pipe length 10 as by fusion or chemically bonding.

Where ceramic or glass fibers are used to reinforce the fitting, the reinforcing agents may be placed in the molten plastic during formation of the fitting in a graduated pattern from 40 to 5 percent as described, or alternatively, the reinforcing agents may be placed in the fitting during its formation in a uniform concentration throughout from one-third to two-thirds the length of the fitting and blended homogeneously with the plastic from which the fitting is made. The remainder of the fitting is made from the same plastic as the body portion of the pipe to insure good welding of the fitting to the pipe.

The foregoing illustrations are exemplary only and it is recognized that the connecting portions 18 of the fittings 20 may be otherwise reinforced and stabilized to obtain the requisite strength and rigidity to accommodate a metallic coupling for effective connection of adjoining lengths of plastic pipe.

An exemplary reinforcement and stabilization of the connecting portion 18 of fitting 20 has been obtained by mixing glass fibers in a ratio of about 10 to 30 weight percent in polyethylene. The fitting is about two to six inches long and the reinforced and stabilized connecting portion 18 is fron one-third to two-thirds the length of the fitting, the remaining joining portion 28 of fitting 20 being the same base polymer as body portion 19 of pipe length 10 or being only slightly reinforced and stabilized so as to provide a good dependable juncture with body portion 19 at the line J in FIG. 2. The slightly reinforced joining portion of fitting 20 in FIG. 2 is joined to body portion 19 as at J by butt fusing. In order to obtain a satisfactory butt fusion it is necessary to use the same polymers or compatible polymers, it being well known that unlike polymers cannot be satisfactorily welded.

Figure 3:
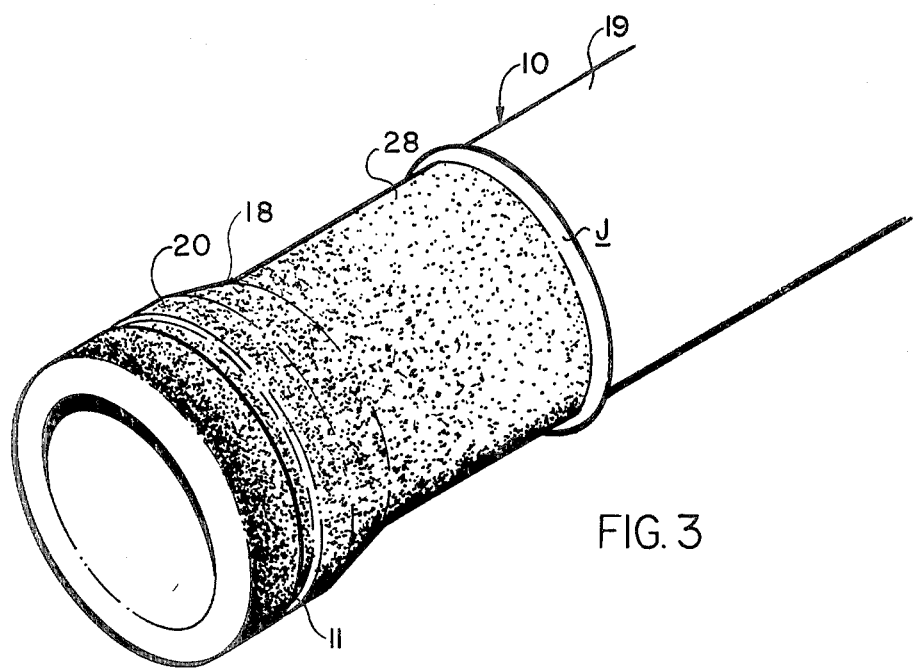
FIG. 3 is a perspective view of a first modified form of fitting having an enthickened connecting portion and stabilized and grooved to conform with a mechanical coupling.

FIG. 3 illustrates a further modification for the reinforcement and stabilization of the connecting portion 18 wherein the wall thickness of connecting portion 18 is substantially greater than the wall thickness of joining portion 28 and of body portion 19 of pipe 10. The mechanical strength properties of the connecting portion 18 are increased as explained and the increase in mechanical strength provides additional reinforcement to the reinforced connecting portion and is desirable to overcome the tendency of the plastic to cold flow relative to a mechanical coupling.

The addition of glass fibers to the base polymer from which the fitting 20 is molded is the preferred way of reinforcing and stabilizing the connecting portion 18 to provide an effective connection. The chart of Table II illustrates the increased mechanical strength properties obtained through the addition of glass fibers to non-reinforced high density polyethylene, commonly used in making plastic pipe:

TABLE I

| PROPERTY | NON-REINFORCED HIGH DENSITY POLYETHYLENE | HIGH DENSITY POLYETHYLENE MIXED WITH 10% GLASS FIBER ⅛" | HIGH DENSITY POLYETHYLENE MIXED WITH 20% GLASS FIBER ⅛" |
|---|---|---|---|
| GENERAL | | | |
| Specific Gravity | .95/gm/cc | 1.02/gm/cc | 1.10/gm/cc |
| MECHANICAL | | | |
| Tensile Strength | 3,500 P.S.I. | 6,000 P.S.I. | 8,000 P.S.I. |
| Flexural Strength | 3,400 P.S.I. | 7,000 P.S.I. | 10,000 P.S.I. |
| Flexural Modulus | 135,000 P.S.I. | 300,000 P.S.I. | 600,000 P.S.I. |
| Compressive Strength | 2,700 P.S.I. | 5,000 P.S.I. | 5,500 P.S.I. |
| Impact Strength Izod Unnotched ¼" Bar | 5-8 | 7-9 | 6-7 |
| THERMAL | | | |
| Heat Distortion Temperature | | | |
| 66 P.S.I. | 175° | 220° | 260° |
| 264 P.S.I. | 120° | 190° | 245° |
| Coefficient of Linear Thermal Expansion | $7 \times 10^5 in/in F.°$ | $5.0 \times 10^5 in/in F.°$ | $3.0 \times 10^5 in/in F.+$ |

An adequate flexural modulus of the connecting portion 18 is considered the most significant mechanical strength property in solving the problem of cold flow inherent in plastics such as the non-reinforced high density polyethylene widely used in plastic piping. It is the inherent tendency of the plastic to cold flow that renders the plastic incompatible with metallic mechanical couplings. A flexural modulus of about 250,000 has been found to be the minimum flexural modulus to provide a reliably effective coupling between a plastic pipe and a metal coupling. Reinforcement and stabilization of the connecting portion of a fitting made from high density polyethylene provides a preferred flexural modulus of 300,000, but the use of about 5% of elongated glass fibers (in the range of ⅛") to reinforce polypropylene achieves a flexural modulus of at least 250,000 which will in some instances provide effective compatibility of the connecting portion of the fitting with a metallic mechanical coupling. Examples of the mechanical strength properties obtainable by the reinforcement with glass fibers of other polymers which may be used in making plastic pipe are shown in Table II:

TABLE II

| PROPERTY | UNITS | NON-REINFORCED POLYPROPYLENE | POLYPROPYLENE WITH 5% GLASS FIBER |
|---|---|---|---|
| GENERAL | | | |
| Specific Gravity | gm/cc | .91 | .98 |
| MECHANICAL | | | |

TABLE II-continued

| Property | Units | | |
|---|---|---|---|
| Tensile Strength | P.S.I. | 4,200 | 6,000 |
| Flexural Strength | P.S.I. | 5,000 | 7,200 |
| Flexural Modulus | P.S.I. | 190,000 | 300,000 |
| Compressive Strength | P.S.I. | 4,000 | 5,000 |
| THERMAL | | | |
| Heat Distortion Temperature 264 P.S.I. | °F. | 140 | 240 |
| Coefficient of Thermal Expansion | in/in°F. | $6.5 \times 10^5$ | $2.9 \times 10^5$ |

| PROPERTY | UNITS | NON-REINFORCED POLYESTER | POLYESTER WITH 30% GLASS FIBER | POLYESTER WITH 30% CARBON FIBER |
|---|---|---|---|---|
| GENERAL | | | | |
| Specific Gravity | gm/cc | 1.32 | 1.52 | 1.47 |
| MECHANICAL | | | | |
| Tensile Strength | P.S.I. | 8,000 | 19,500 | 20,000 |
| Flexural Strength | P.S.I. | 13,000 | 28,000 | 29,000 |
| Flexural Modulus | P.S.I. | 350,000 | 1,350,000 | 2,000,000 |
| Impact Strength Izod Unnotched ¼" Bar | | 3.0 | 14 | 15 |
| THERMAL | | | | |
| Heat Distortion Temperature 264 P.S.I. | °F. | 155 | 430 | 430 |
| Coefficient of Thermal Expansion | in/in°F. | $5.3 \times 10^5$ | $1.2 \times 10^5$ | $0.5 \times 10^5$ |

It is well known that non-reinforced polyester is too brittle for use as a pipe, lacking the requisite tensile strength, even though its flexural modulus is above the value found to be compatible with a metallic mechanical connector for a reliably efficient connection. Reinforcement of the polyester with glass fibers or carbon fibers increases the tensile strength to a satisfactory level and increases the flexural modulus far above the requisite value (Table II).

Exemplary of the reinforcing capabilities of other agents is the addition of carbon fibers to thermoplastic polyester. Greater benefits in terms of flexural modulus are obtained from reinforcement with carbon than with glass. Thus, assuming equal loadings of glass fibers and carbon fibers to different batches of polyester, the flexural modulus of the carbon fiber polyester is almost 50% greater than the flexural modulus of the glass fiber polyester (Table II). A lower concentration of carbon fiber will thus achieve the same flexural modulus in plastic as a higher level of glass fiber. For example 5 to 7% carbon fiber in high density polyethylene will be the equivalent of 10 to 15% glass fiber in high density polyethylene.

The difference between the mechanical strength properties of the base polymer from which body portion 19 and joining portion 28 are formed and the mechanical strength properties of reinforced connecting portion 18 characterizes the invention. As used herein, the phrase "increasing the mechanical strength properties" is generic to all means for reinforcing and stabilizing the connecting portion 18 relative to the base polymer of the body portion 19 to be effectively compatible with a conventional mechanical coupling to provide a reliably effective connection of lengths of plastic pipe that will not leak or pull apart during high pressure usage.

Referring to FIGS. 4 and 5, the connecting portions 18 and 18' of fittings 35 and 35' are reinforced and stabilized as at 37 and 37' in the same manner as described, but the configuration of the fitting for connection to a like fitting has been modified by providing peripheral flanges 36 and 36' on the connecting portions 18 of the fittings. The joining portions 28 and 28' of fitting 35 and 35' is made of the same virgin base polymer as the body portion 19 of pipe lengths 10 and 10' to permit satisfactory welding of the fittings 35 and 35' to their respective body portions 19 and 19' as at J and J'.

The peripheral flange 36 on fitting 35 is similar to the known prior art of providing a flange on a polyethylene pipe for connection to a mechanical coupling for joining two flanged fittings together. The fitting 35 and its flange 36 reinforced in accordance with this invention do not require a special coupling to connect two adjoining fittings. Instead, the flanges 36 and 36' on adjoining fittings 35 and 35' may be connected by conventional steel bolts 38 penetrating the flanges 36 and 36'. A gasket 39 may be positioned between the flanges 36 and 36' to prevent leakage.

In the drawings and specification there has been set forth a preferred embodiment of the invention and although specific terms are employed they are used in a generic and descriptive sense only and not for purposes of limitation.

What is claimed is:

1. Means for connecting lengths of plastic pipe having a given flexural modulus with a mechanical coupling having a higher flexural modulus than the said given flexural modulus of the plastic pipe whereby the plastic pipe has an objectionable tendency to cold flow or move relative to the mechanical coupling responsive to changes in temperature and pressure, said means comprising a plastic pipe fitting with a joining portion extending inwardly from a first end of said plastic fitting for attachment to the length of plastic pipe and a connecting portion extending inwardly from a second end of said plastic fitting for attachment to the mechanical coupling, said first end of the fitting having a flexural modulus sufficiently the same as the said given flexural modulus of the plastic pipe to enable a reliably effective connection of the first end of the fitting to the plastic pipe as by butt fusion, and the flexural modulus of the plastic fitting gradually increasing from the first end of the fitting toward the second end of the fitting, and the connecting portion at the second end of the fitting being shaped to conform with the mechanical coupling and having a higher flexural modulus than the first end of the fitting and sufficiently the same as the flexural modulus of the mechanical coupling to enable a reliably effective connection without the said objectionable tendency to cold flow or move relative to the mechanical coupling responsive to changes in temperature and pressure.

2. Means for connecting lengths of plastic pipe according to claim 1 wherein said plastic pipe fitting has a relatively low molecular weight at its said first end, and wherein the molecular weight of said plastic pipe fitting gradually increases along its length in a direction toward said second end with the molecular weight of the plastic pipe fitting at its said second end being higher than the molecular weight at the first end of the said plastic pipe fitting.

3. Means for connecting lengths of plastic pipe according to claim 1 wherein said plastic pipe fitting has a relatively high percentage of reinforcing agents added to said connecting portion, and wherein the percentage of said reinforcing agents added to said plastic pipe fitting gradually decreases along the length of said fitting in a direction toward said joining portion with the percentage of said reinforcing agents being substantially zero at said first end of said plastic pipe fitting.

4. Means for connecting lengths of plastic pipe according to claim 1 wherein the plastic pipe fitting is formed from a thermoplastic material.

5. A structure according to claim 4 wherein the thermoplastic is polyethylene.

6. A structure according to claim 4 wherein the thermoplastic is polypropylene.

7. A structure according to claim 4 wherein the thermoplastic is polybutylene.

8. A structure according to claim 4 wherein the thermoplastic is polyvinylchloride.

9. A structure according to claim 4 wherein the thermoplastic is fluorinated ethylene polymer.

10. A structure according to claim 4 wherein the thermoplastic is ABS.

11. A structure according to claim 4 wherein the thermoplastic is polyester.

12. A structure according to claim 4 wherein the thermoplastic is polyurethane.

13. A structure according to claim 4 wherein the thermoplastic is a copolymer.

14. A structure according to claim 4 wherein the thermoplastic is a plastic alloy.

15. Means for connecting lengths of plastic pipe according to claim 1 wherein the plastic pipe fitting is formed from a thermosetting material.

16. A structure according to claim 15 wherein the thermosetting material is phenolic.

17. A structure according to claim 15 wherein the thermosetting material is polyester.

18. A structure according to claim 15 wherein the thermosetting material is polyether.

19. A structure according to claim 15 wherein the thermosetting material is urethane.

20. A structure according to claim 3 wherein said connecting portion includes from five to forty percent by weight of reinforcing agents.

21. A structure according to claim 20 wherein the reinforcing agents are organic.

22. A structure according to claim 20 wherein the reinforcing agents are inorganic.

23. A structure according to claim 20 wherein the reinforcing agents are a combination of organic and inorganic materials.

24. A structure according to claim 20 wherein the reinforcing agents are carbon fibers and glass fibers.

25. A structure according to claim 21 wherein the organic reinforcing agent is carbon fiber.

26. A structure according to claim 21 wherein the organic reinforcing agent is polyaramide fiber.

27. A structure according to claim 22 wherein the inorganic reinforcing agent is fiberglass.

28. A structure according to claim 22 wherein the inorganic reinforcing agent is glass beads.

29. A structure according to claim 22 wherein the inorganic reinforcing agent is ceramic fibers or beads.

30. A structure according to claim 22 wherein the inorganic reinforcing agent is selected from a mineral group including talc or mica.

31. A structure according to claim 22 wherein the inorganic reinforcing agent is boron.

32. A structure according to claim 22 wherein the inorganic reinforcing agent is tungsten.

33. A structure according to claim 1 wherein the shaped area at the connecting portion of the fitting comprises an annular groove engageable with the mechanical coupling.

34. A pipe fitting according to claim 1 wherein the shaped area at the connecting portion of the fitting comprises an annular flange.

35. A structure according to claim 1 wherein the joining portion and the length of plastic pipe are made from the same polymer.

36. A structure according to claim 1 wherein the flexural modulus of the connecting portion at the second end of the fitting is at least 250,000.

37. A structure according to claim 1 wherein the flexural modulus of the connecting portion at the second end of the fitting is at least 300,000.

38. A structure according to claim 2 wherein the molecular weight of the said second end of the plastic pipe fitting is at least 500,000.

39. A structure according to claim 3 wherein the percentage of reinforcing agents by weight at said connecting portion is about forty percent and wherein the percentage of reinforcing agents in the plastic pipe fitting reduces in the direction from the connecting portion to the joining portion from about forty percent to twenty percent to zero percent at the juncture of the plastic pipe fitting with a length of plastic pipe.

* * * * *